DEWATERING OF DIGESTED SLUDGE
Filed April 15, 1970
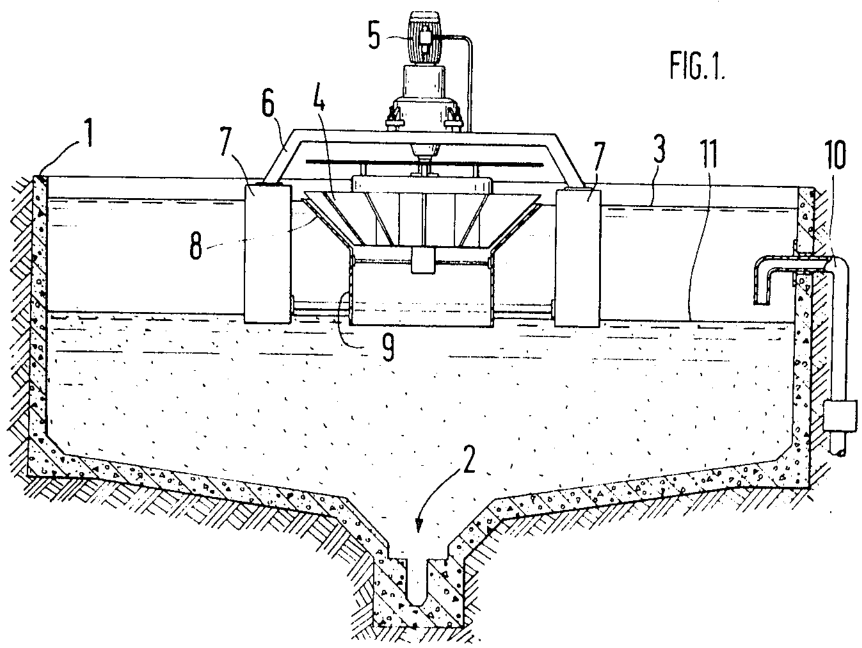
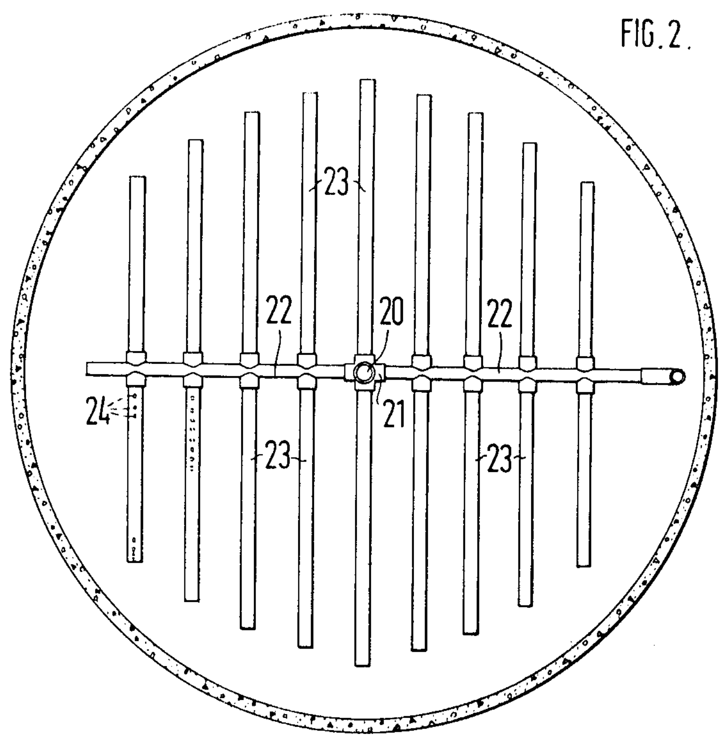

United States Patent Office 3,649,531

Patented Mar. 14, 1972

3,649,531

DEWATERING OF DIGESTED SLUDGE

Basil Reginald Brown and Leslie Ballentyne Wood, London, England, assignors to National Research Development Corporation, London, England Filed Apr. 15, 1970, Ser. No. 28,645
Claims priority, application Great Britain, Apr. 18, 1969, 19,905/69
Int. Cl. C02c *1/14*
U.S. Cl. 210—10 9 Claims

ABSTRACT OF THE DISCLOSURE

The dewatering time of a sludge obtained by anaerobic digestion of a primary sewage sludge is reduced substantially by subjecting the digested sludge to aeration with air or other suitable oxygen containing gas. Typically, aeration is carried out for at least 4 hours, the sludge is allowed to settle, and then dewatered within two days. Aeration may be carried out by means of diffused air or, preferably, by mechanical means using a surface aerator.

This invention relates to sewage sludge disposal.

In the disposal of sewage the first operation, after mechanical removal of coarse material on screens and grit in detritus tanks, is a primary sedimentation to produce a sludge component, termed "raw" or "primary" sludge, and and a supernatant liquid component, termed "primary effluent," which is processed further. The raw (primary) sludge is then digested under anaerobic conditions in order to eliminate pathogens and produce a more acceptable odour in the sludge prior to its disposal. The primary effluent is subjected to further microbiological treatment in order to remove as much as possible of the dissolved and suspended material so that the resulting liquid is acceptable as an effluent. This treatment involves sorption and oxidation on biological films or sludges which are the habitat of the micro-organisms necessary for the process. The form of microbiological treatment most commonly practiced at the present time is that known as the "activated sludge process" although an older process involving treatment on percolating filters is still in extensive use. The activated sludge process and the percolating filter process give rise to sludges which are usually recycled.

The present invention is concerned with the problem of disposal of anaerobically digested sludge, i.e. sludge resulting from the anaerobic digestion of "primary" sludge which term, for the purpose of this specification, signifies sludge resulting from a primary sedimentation operation; this term also includes material deriving from the primary sedimentation tank augmented with recycled sludge recovered from the primary sedimentation liquor by the activated sludge process, percolating filter process, or any other means.

Prior to its disposal it is customary to allow anaerobically digested sludge to settle in order to dewater thereby reducing as much as possible the volume of material which is to be transported to a point of disposal on land, at sea, in incinerators, or otherwise. It is therefore necessary to operate the dewatering process with high efficiency producing a sludge of high solids content. At most sewage works in Great Brittain, for example, sludge has a solids content of about 2½% immediately after digestion and it is desirable to increase this figure as much as possible whilst maintaining a sufficiently fluid consistency to facilitate subsequent handling especially when the sludge is to be discharged from ships.

Operating according to present techniques, freshly digested sludge takes many weeks to dewater and this is due to the fact that continuing digestion in the sludge causes evolution of gas which holds the sludge flocs in suspension. The use of bactericides provides only a partial solution of this difficulty and has no effect in minimising gas already present in the sludge as free bubbles or pockets of gas entrapped therein.

It has now been found that the time required for dewatering to take place may be dramatically reduced by subjecting anaerobically digested sludge to aeration.

The present invention therefore comprises a process for reducing the dewatering time of a sludge obtained by anaerobic digestion of a primary sewage sludge in which the digested sludge is subjected to aeration with air or other suitable oxygen containing gas.

Thus by proceeding in accordance with this invention dewatering can be achieved in periods as low as 24 hours to a degree which at present requires from 3–6 weeks by existing methods. The process is remarkably effective and quite surprising in that in spite of vigorous aeration, no further air is entrapped in the sludge.

The duration of aeration may be varied widely but outstanding results are obtained in relatively few hours. For example, aeration for about four hours at sufficient intensity will suppress further gas formation in the sludge for a period of 1–2 days and longer and has the additional adtage that it displaces gas held in the sludge flocs so that all gas is removed and none further is formed. After termination of aeration, gas formation will eventually recommence and therefore separation of supernatant from the sludge is recommended within, say, 3 or 4 days or thereabouts.

As well as reducing the time of dewatering, the process of the present invention also gives rise to sludges of high solids content, e.g. from 4–7%. The invention therefore constitutes a substantial advance over existing practice in reducing transport costs and reducing the size of dewatering plant require, as well as allowing for disposal of sludge at a higher rate than is at present possible and consequently reducing smell nuisance.

Aeration may be carried out by means of diffused air, i.e. bubbles of a coarse or fine nature may be dispersed throughout the sludge usually from a point deep in the tank containing it. Preferably, however, aeration is carried out by means of a mechanical device operating at or a little below the surface of the sludge which entrains air from the surrounding atmosphere into the sludge. The degree of aeration achieved by the latter means varies with the depth of penetration of the device into the sludge. Best results have so far been obtained with a rotating cone type surface aerator, e.g. the "Simplex" aerator manufactured by Ames Crosta Mills Ltd. For use in very deep tanks it is advantageous to supplement the action of a cone type aerator with an updraft tube. Mechanical aeration may be achieved by means of fixed or floating devices. Floating devices are convenient in that they may be removed readily from tank to tank.

Examples of operating the process will now be provided illustrating various methods of aeration, the duration of operation, and the results obtained. The process can be operated with conventional aeration equipment ued in the activated sludge process.

EXAMPLE 1

Anaerobically digested sludge is charged into a cylindrical concrete tank of dimensions 20 ft. high and 6 ft. diameter, which is fitted with an aerator consisting of ceramic tubular diffusers so arranged that they form 6 arms, each at an angle of 60° from the adjacent one, radiating from a central chamber into which air is passed. The porosity of the diffusers is such that very fine bubbles are produced. The sludge is aerated for periods varying from 6 to 24 hours, depending on the intensity of aeration, and then allowed to stand without aeration during which time it consolidates and sinks to the bottom, leaving a supernatant liquor substantially free from suspended solids. Typical results are given in Table 1.

TABLE 1

| | Period of aeration (hrs.) | Original sludge solids content, percent | Sludge solids content, percent after— | | |
|---|---|---|---|---|---|
| | | | 1 day | 2 days | 3 days |
| Run No.: | | | | | |
| 1 | 24 | 2.3 | | | 3.4 |
| 2 | 24 | 3.4 | | 4.3 | |
| 3 | 24 | 4.0 | 5.1 | | |
| 4 | 24 | 1.9 | | | 4.0 |
| 5 | 24 | 2.1 | | | 3.8 |
| 6 | 24 | 2.4 | | | 5.5 |

EXAMPLE 2

Digested sludge is charged into a cylindrical concrete tank of dimensions 40′ diameter and 10′6″ working depth equipped with an aerator capable of producing "coarse bubble aeration." The base of the tank is in the form of an inverted hollow cone. The diffuser is constructed from a series of 6″ diameter mild steel pipes, branching from both sides of a single pipe across the diameter of the tank and extending to the sides. On the underside of the pipe, along the whole length, a series of 1/8″ diameter holes are drilled and spaced regularly at 1″ intervals, totalling 2056 holes. A connection for supplying air to the pipes is provided. The volume of digested sludge (approximately 400 tons) is aerated for 24 hours and then allowed to stand as in Example 1. Typical results are shown in Table 2.

TABLE 2

| | Period of aeration (hrs.) | Original sludge solids content, percent | Sludge solids content, percent after— | | |
|---|---|---|---|---|---|
| | | | 1 day | 2 days | 3 days |
| Run No.: | | | | | |
| 1 | 24 | 2.7 | | | 5.1 |
| 2 | 24 | 2.8 | | 3.9 | |
| 3 | 24 | 2.8 | | | 4.8 |
| 4 | 24 | 3.0 | | | 4.8 |
| 5 | 24 | 2.9 | | | 5.0 |

EXAMPLE 3

The process is carried out as described in Example 2. The supernatant liquor is removed and the sludge reaerated for up to 24 hours and then allowed to settle. Typical results are given in Table 3.

TABLE 3

Run No. 10:

| | |
|---|---|
| Original sludge solids content | 3.0 |
| Sludge solids content after first aeration | 4.4 |
| Sludge solids content after second aeration | 5.1 |

EXAMPLE 4

Digested sludge is aerated in a concrete tank of cubical shape with a base shaped in the form of an inverted frustum of a pyramid with a working volume of 400 tons. The tank is equipped with a mechanical rotating cone aerator with an upcast tube to promote circulation within the tank. Such a device is shown by way of example in the accompanying drawing which is a diagrammatic vertical section through the apparatus.

The tank is indicated by reference numeral 1 and is formed with a sump 2 through which sludge is drawn off by means of a pump (not shown). The surface of the sludge is indicated at 3, and mounted on the surface 3 is a floating aerator comprising a rotatable cone 4 driven by a motor 5 and carried on a framework 6 supported on buoyancy tanks 7. The cone 4 comprises a number of impeller blades arranged to form an outer contour of generally conical shape. The cone 4 operates within an outer cone 8 connected to a tubular extension 9 which together form an updraft tube aerator. In the wall of the tank 1 is mounted an outlet pipe 10 which may be connected to a pump or arranged to operate by a siphon action to draw off supernatant liquid. The level of the settled sludge is indicated at 11.

In an alternative embodiment (not shown) the buoyancy tanks are omitted and the cone 4 is held in a fixed position in the tank in which case a fixed and much longer updraft tube can be employed.

Operating with an aerator procedure as described in the preceding examples, typical results are shown in Table 4.

TABLE 4

| Percent total solids content of original sludge | Aeration time in hours | Supernatant liquor separation, percent by volume after settlement time of— | | | | |
|---|---|---|---|---|---|---|
| | | 1 day | 2 days | 3 days | 4 days | 5 days |
| 2.2 | 12 | 13.8 | 20.0 | 22.5 | 24.5 | 25.3 |
| 2.5 | (1) | No settlement after 6 days | | | | |
| 2.4 | 24 | 7.5 | | 22.5 | 33.9 | 33.9 |
| 2.3 | 24 | 3.6 | 22.5 | 32.7 | 38.8 | |
| 2.4 | 24 | | 26.1 | 33.8 | 37.6 | 37.6 |
| 2.5 | 24 | 5.0 | 25.3 | 30.1 | 36.3 | 38.8 |
| 2.5 | 24 | | 25.1 | 30.0 | 35.7 | 35.7 |
| 2.7 | [2] 24 | 30.0 | 40.1 | 43.3 | 43.3 | |
| 2.4 | [2] 24 | 26.4 | 33.9 | | 40.7 | |
| 2.6 | [2] 12 | 26.8 | | 43.2 | 43.2 | |
| 2.7 | [2] 12 | 24.5 | 30.7 | | | |
| 2.5 | [2] 6 | [3] 24.5 | [3] 33.2 | [4] 43.0 | (5) | |

[1] No aeration.
[2] With shroud.
[3] 36 hours.
[4] 60 hours.
[5] 84 hours.

In a further embodiment employing diffused air, a tank similar to that illustrated is employed, but the aerator takes the form as shown in FIG. 2 which is a plan view. The aerator consists of a central vertical tube 20 fitting into a cross shaped connector 21 from which project horizontal tubes 22 carrying branches 23 at right angles to it and extending towards the wall of the tank. The tubes 22 and 23 are formed with holes 24 on their underlying surfaces through which air or other suitable gas is passed into the sludge.

We claim:

1. A process for treating a sludge obtained by anaerobic digestion of a primary sewage sludge to improve the subsequent separation of supernatant liquor from the digested sludge which comprises subjecting the digested sludge, prior to separation of supernatant liquor from the digested sludge, to aeration with a free oxygen-containing gas under such conditions that the digested sludge retains the character of digested sludge as opposed to activated sludge while gas formation due to anaerobic organisms is substantially inhibited and immediately thereafter dewatering the aerated digested sludge while maintaining the digested sludge free from contact with raw sewage by allowing the sludge to settle and then separating supernatant liquor from the resultant settled sludge before recommencement of gas formation therein due to anaerobic organisms.

2. A process according to claim 1, in which aeration is carried out for at least 4 hours, the sludge is allowed to settle, and then dewatered within three or four days thereafter.

3. A process according to claim 2, in which aeration is carried out for a time within 6 to 24 hours.

4. A process according to claim 1 in which aeration is carried out by means of diffused air.

5. A process according to claim 1 in which aeration is induced by mechanical means operating at the surface of the sludge.

6. A process according to claim 5, in which the aerator is a rotating cone type aerator.

7. A process according to claim 6, in which the aerator also comprises an updraft tube.

8. A process according to claim 1 operated continuously.

9. A process according to claim 2, in which the resultant sludge has a solids content of from about 4% to about 7%.

References Cited

UNITED STATES PATENTS

| | | | |
|---|---|---|---|
| 2,442,241 | 5/1948 | Korvzo et al. | 210—10 X |
| 2,875,151 | 2/1959 | Davidson | 210—16 X |
| 3,256,179 | 6/1966 | Teletzke et al. | 210—16 X |
| 3,470,092 | 9/1969 | Bernard | 210—15 |

REUBEN FRIEDMAN, Primary Examiner

T. G. WYSE, Assistant Examiner

U.S. Cl. X.R.

210—16